No. 81,195.                            PATENTED AUG. 18, 1868.
D. NEWTON.
FRICTION BRAKE FOR SEWING MACHINES.
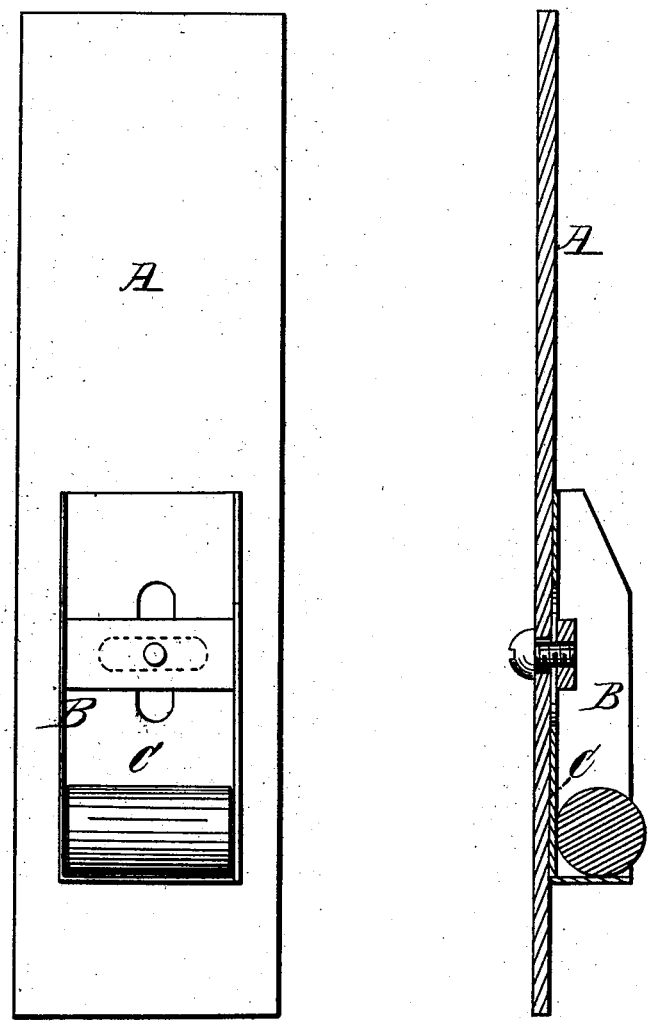
Witnesses,
J. F. Pratt
C. E. Beale
Inventor
Daniel Newton

UNITED STATES PATENT OFFICE.

DANIEL NEWTON, OF SOUTHINGTON, CONNECTICUT.

IMPROVEMENT IN FRICTION-BRAKES FOR SEWING-MACHINES.

Specification forming part of Letters Patent No. 81,195, dated August 18, 1868.

*To all whom it may concern:*

Be it known that I, DANIEL NEWTON, of Southington, in the county of Hartford and State of Connecticut, have invented a Device to Prevent the Backward or Reverse Motion of Sewing-Machines; and I do hereby declare that the following is a full and accurate description of the construction and operation of the same.

The nature of my invention consists in a horizontal cylinder supported on an angle against the fly-wheel of sewing-machines, which acts as a brake on each attempt of a reverse motion.

To enable others to make and use my invention, I will proceed to describe its construction and operation.

I make a plate of metal, A, of suitable size and shape for the kind of machine it is designed for. In this plate I make an oblong hole at right angles of the same. On the plate A is placed a trough, B, having the sides of the same at right angles with the bottom, closed at one end and open at the other. In the middle of the trough B is an oblong hole, running parallel with the same. Through the oblong hole in the plate and trough passes a screw, which ends in a nut inside of the trough, by which the trough and plate are fastened together, and the trough made adjustable, in order that it may be placed in a position central with the fly-wheel. In the trough B I place a cylinder, C, crosswise, the length of which must be a trifle less than the width of the trough, to allow it to revolve freely without changing its position.

The apparatus herein described must be fastened to the machine on an angle suitable to retain the cylinder against the fly-wheel by its own gravity. Thus secured to the machine, any attempt at a reverse motion is prevented by the cylinder wedging under the wheel; but whenever the operator wishes to reverse the motion, the cylinder must be held back from the wheel. The trough must be so adjusted that the upper or closed end will be near the cylinder, to prevent the wheel from throwing it out of place. The screw which passes through the plate and trough is designed to secure the two firmly together, and the oblong holes in each are for the purpose of adjusting the trough either parallel or transversely of the plate, to bring the cylinder central with the wheel, and about one-fourth of an inch from the closed end of the trough.

I claim—

The loosely-inclosed cylinder C, of suitable material, within the trough B, the latter being securely held to plate A, and is adjustable by means of screw and slots, the whole arranged and applied substantially as described, and for the purpose set forth.

DANIEL NEWTON.

Witnesses:
W. H. SULLIVAN,
JOSHUA BILLS.